(12) United States Patent
Schmidt et al.

(10) Patent No.: US 11,365,290 B2
(45) Date of Patent: Jun. 21, 2022

(54) MODIFIED PRECERAMIC POLYMERS, METHOD OF MAKING AND CERAMIC MATRIX COMPOSITE FORMED THEREFROM

(71) Applicant: United Technologies Corporation, Farmington, CT (US)

(72) Inventors: Wayde R. Schmidt, Pomfret Center, CT (US); Paul Sheedy, Bolton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/692,620

(22) Filed: Nov. 22, 2019

(65) Prior Publication Data

US 2021/0155760 A1 May 27, 2021

(51) Int. Cl.
| | |
|---|---|
| *C08G 77/398* | (2006.01) |
| *C08G 77/60* | (2006.01) |
| *C04B 35/56* | (2006.01) |
| *C04B 35/571* | (2006.01) |

(52) U.S. Cl.
CPC .......... *C08G 77/60* (2013.01); *C04B 35/5607* (2013.01); *C04B 35/571* (2013.01); *C08G 77/398* (2013.01); *C04B 2235/3804* (2013.01); *C04B 2235/3826* (2013.01)

(58) Field of Classification Search
None
See application file for complete search history.

(56) References Cited

U.S. PATENT DOCUMENTS

| | | | | |
|---|---|---|---|---|
| 4,220,600 A * | 9/1980 | Yajima | .................. | C01B 32/977 556/434 |
| 4,359,559 A * | 11/1982 | Yajima | .................... | C01B 32/90 525/475 |
| 4,546,163 A | 10/1985 | Haluska | | |
| 4,611,035 A * | 9/1986 | Brown-Wensley | .... | C08G 77/50 423/345 |
| 4,762,895 A * | 8/1988 | Chandra | ............... | C04B 35/571 525/474 |
| 4,820,788 A * | 4/1989 | Zeigler | ................ | C08G 77/485 430/323 |
| 5,070,116 A * | 12/1991 | Seyferth | ................ | C08G 77/58 522/22 |
| 5,204,380 A * | 4/1993 | Seyferth | ............... | C04B 35/571 522/148 |
| 6,627,126 B2 | 9/2003 | Schmidt et al. | | |
| 9,169,163 B2 | 10/2015 | Schmidt | | |
| 9,745,226 B2 | 8/2017 | Schmidt | | |
| 10,300,624 B2 | 5/2019 | Schmidt | | |
| 2007/0093587 A1 * | 4/2007 | Shen | ..................... | C01B 32/977 524/404 |
| 2007/0178038 A1 * | 8/2007 | Pope | ................. | C04B 35/62277 423/406 |
| 2010/0087311 A1 * | 4/2010 | Yamaoka | .................. | C02F 1/32 502/242 |
| 2013/0109559 A1 * | 5/2013 | Suyama | .................... | D01F 1/10 502/5 |
| 2013/0184142 A1 * | 7/2013 | Schmidt | ............... | C04B 35/563 501/154 |
| 2015/0030856 A1 | 1/2015 | Singh et al. | | |
| 2016/0236987 A1 | 8/2016 | Berczik et al. | | |
| 2019/0016640 A1 | 1/2019 | Garcia et al. | | |

FOREIGN PATENT DOCUMENTS

JP        H01298073     * 12/1989   ............. C04B 35/38

OTHER PUBLICATIONS

Zechmann, A., and E. Hengge. "Syntheses of tungsten-substituted oligosilanes." Journal of organometallic chemistry 508, No. 1-2 (1996): 227-230. (Year: 1996).*
Hua, et al. "Electrochemical synthesis and characterization of polysilane with zirconium." Acta Polymerica Sinica 6 (2011). (Year: 2011).*
Datasheet for Zirconium, 2 pages, 2020. (Year: 2020).*
Evidentiary sheet for the definition of refractory metals, 7 pages, 2020. (Year: 2020).*
Okuzaki et al. "Processing of silicon carbide ceramics using chemically modified polycarbosilanes." Journal of materials research 14, No. 1 (1999): 189-195. (Year: 1999).*
Shankar et al. "Synthesis of poly(hydrosilane)s,—[R1(H)Si]n-(R1=(CH2)3SiRR'2; R, R'=Me, Et or Ph) and their reactivity studies towards allyl/vinylsilanes" Journal of Organometallic Chemistry 2006, 691, 3310-3318. (Year: 2006).*
Thorne et al. "Synthesis of SiC/TaC ceramics from tantalum alkoxide modified polycarbosilane" J. Mater. Res. 6(10), 1991, 2199-2207. (Year: 1991).*
Yamamura et al. "A New Type of Ceramic Matrix Composite Using Si—Ti—C—O Fiber" Ceram. Eng. Sci. Proc. 10(7-8), 736-747, 1989. (Year: 1989).*
European Partial Search Report for European Application No. 20208872.0; Application Filing Date: Nov. 20, 2020; 16 pages.
Replacement Search Report for European Application No. 20208872.0; Application Filing Date: Nov. 20, 2020; dated Sep. 24, 2021, 14 pages.

* cited by examiner

*Primary Examiner* — Robert S Loewe
(74) *Attorney, Agent, or Firm* — Cantor Colburn LLP

(57) ABSTRACT

Disclosed is a modified preceramic polymer having a polymer backbone consisting of silicon or a combination of silicon and carbon; and a pendant modifier bonded to the backbone wherein the modifier includes silicon, boron, aluminum, a transition metal, a refractory metal, or a combination thereof. The modified preceramic polymer can be used to form a ceramic matrix composite.

7 Claims, No Drawings

MODIFIED PRECERAMIC POLYMERS, METHOD OF MAKING AND CERAMIC MATRIX COMPOSITE FORMED THEREFROM

BACKGROUND

Exemplary embodiments pertain to the art of preceramic polymers, methods of making preceramic polymers and ceramic matrix composites made from preceramic polymers.

Silicon carbide (SiC) and other ceramic materials are used to produce articles having high structural and mechanical strength at a temperature above 1,200° C. (2,200° F.). The articles can be used in aerospace and other industries needing resistance to heat. As operation temperatures increase above 1,200° C., material options for the articles decrease because metal and metal alloys are not viable. While ceramic matrix composites (CMCs) and carbon-carbon (C/C) materials are conventionally used at these temperatures, these materials are expensive and time intensive to produce by conventional precursor impregnation and pyrolysis, slurry infiltration, melt infiltration, or chemical vapor infiltration techniques. Processing of the CMCs and C/C materials requires multiple heat treatments and processing steps to densify the materials and provide the desired densities and strengths. Producing CMCs typically requires multiple infiltration cycles, which increases the overall cost and amount of time to fabricate the CMCs. Additionally, conventional furnaces used to produce the articles are limited in their ability to uniformly process larger articles, such as those needed for large rocket and turbine engine components, structural housings, combustors, and similar articles.

One method of forming SiC and other ceramic materials is from preceramic polymers. One commonly used preceramic polymer is polycarbosilane. However, the ceramic materials formed from conventional polycarbosilane cannot be used at the increasing temperatures needed for new applications. Improved preceramic polymers are desired.

BRIEF DESCRIPTION

Disclosed is a modified preceramic polymer having a polymer backbone consisting of silicon or a combination of silicon and carbon; and a pendant modifier bonded to the backbone wherein the pendant modifier includes silicon, boron, aluminum, a transition metal, a refractory metal, or a combination thereof.

In addition to one or more of the features described above, or as an alternative to any of the foregoing embodiments, the pendant modifier includes silicon, boron, aluminum, or a combination thereof.

In addition to one or more of the features described above, or as an alternative to any of the foregoing embodiments, the pendant modifier includes titanium, zirconium, hafnium, vanadium, chromium, or a combination thereof.

In addition to one or more of the features described above, or as an alternative to any of the foregoing embodiments, the pendant modifier includes niobium, tantalum, molybdenum, tungsten, rhenium, or a combination thereof.

In addition to one or more of the features described above, or as an alternative to any of the foregoing embodiments, the pendant modifier to backbone silicon atomic ratio is 4:1 to 0.05:1.

In addition to one or more of the features described above, or as an alternative to any of the foregoing embodiments, the pendant modifier to carbon atomic ratio is 4:1 to 0.05:1.

Also disclosed is a method of making a modified preceramic polymer including reacting a preceramic polymer with a modifier source selected from the group consisting of silicon compounds having a reactive group, boron compounds having a reactive group, organometallic compounds having a reactive group, metal organic compounds having a reactive group, functionalized inorganic particulates having a reactive group, and combinations thereof. The preceramic polymer has a polymer backbone consisting of silicon or a combination of silicon and carbon.

In addition to one or more of the features described above, or as an alternative to any of the foregoing embodiments, the organometallic compound includes a metal amine.

In addition to one or more of the features described above, or as an alternative to any of the foregoing embodiments, the reactive group includes amines, tri-functional silanes, halides, hydrides, amides, hydroxides, silyl groups, vinyl groups, allyl groups, alkoxides, alcohols, substituted ethers, and combinations thereof.

In addition to one or more of the features described above, or as an alternative to any of the foregoing embodiments, the preceramic polymer is a mixture of polysilane and polycarbosilane.

In addition to one or more of the features described above, or as an alternative to any of the foregoing embodiments, the preceramic polymer includes a vinyl group.

Also disclosed is a ceramic matrix composite comprising reinforcing fibers and a matrix, wherein the matrix comprises silicon carbide and metal carbide and the metal carbide is homogeneously dispersed throughout the silicon carbide.

In addition to one or more of the features described above, or as an alternative to any of the foregoing embodiments, the ceramic matrix composite further includes a metal boride.

In addition to one or more of the features described above, or as an alternative to any of the foregoing embodiments, the metal carbides are dispersed on a sub-nanometer level.

In addition to one or more of the features described above, or as an alternative to any of the foregoing embodiments, the metal carbides are dispersed on a molecular level.

Also disclosed is a method of making a ceramic matrix composite comprising infiltrating a fiber preform with a modified preceramic polymer to form an infiltrated preform and pyrolyzing the infiltrated preform to form the ceramic matrix composite, wherein the modified preceramic polymer has a polymer backbone consisting of silicon or a combination of silicon and carbon; and a pendant modifier bonded to the polymer backbone. The pendant modifier includes silicon, boron, aluminum, a transition metal, a refractory metal, or a combination thereof.

DETAILED DESCRIPTION

A detailed description of one or more embodiments of the disclosed apparatus and method are presented herein by way of exemplification and not limitation.

A modified preceramic polymer useful for forming a composite material having a low mass loss and a high ceramic yield is disclosed, as are methods of forming the modified preceramic polymer and the composite material. The modified preceramic polymer includes pendant modifiers bonded to the preceramic polymer backbone. Preceramic polymers form ceramics by pyrolyzing to form ceramic compounds such as silicon carbide from the silicon and carbon present in the preceramic polymer. The pendant modifiers increase the char yield (the ceramic yield) after pyrolysis by forming carbides, for example, with excess carbon atoms that do not form silicon carbide with the silicon from the polymer backbone.

The modified preceramic polymer is produced by reacting the preceramic polymer with a modifier source. The preceramic polymer comprises a polymer backbone. The polymer backbone consists of silicon or a combination of silicon and carbon. When the polymer backbone consists of silicon the preceramic polymer is a polysilane. When the polymer backbone consists of silicon and carbon the preceramic polymer is a polycarbosilane.

Polysilanes are formed of repeating units having formula (I)

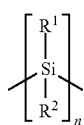

and polycarbosilanes are formed of repeating units having formula (II)

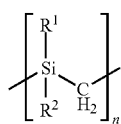

where $R^1$ and $R^2$ of each repeating unit is independently a hydrogen (H) group, a methyl ($CH_3$) group, a vinyl group ($CH=CH_2$), or an allyl group ($CH_2-CH=CH_2$) and n is an integer from 2 to 10,000 (e.g., from 100 to 5,000). In polycarbosilanes formed of repeating units having formula (II) the polymer backbone consists of silicon and carbon in methylene groups. In the repeating units having formula (I) and (II) $R^1$ and $R^2$ are not part of the polymer backbone. When vinyl groups are present, the vinyl group may be directly bonded to the silicon atom or may be bonded to the silicon atom by an alkyl group or other linker. By way of example only, the alkyl group may include from one carbon atom to six carbon atoms. In some embodiments at least a portion of the repeating units in the polycarbosilane or polysilane include the vinyl group as $R^1$ or $R^2$. The preceramic polymer may include at least about 0.01 vinyl eq/kg, such as 0.2 vinyl eq/kg to about 5.0 vinyl eq/kg. The preceramic polymer may also include at least about 0.01 hydride eq/kg, such as from about 0.2 hydride eq/kg to about 10 hydride eq/kg.

Polysilanes and polycarbosilanes are commercially available from numerous sources including, but not limited to, EEMS, LLC (Saratoga Springs, N.Y.), Starfire Systems, Inc. (Schenectady, N.Y.), or Matech (Westlake Village, Calif.), Gelest, Nippon Soda Co, Union Carbide and Momentive. The polycarbosilane may include but is not limited to, SMP-10, StarPCS® SMP-500, or StarPCS® SMP-877 silicon carbide precursor from Starfire Systems, Inc. (Malta, N.Y.). Additional polycarbosilanes are commercially available from SEMS, LLC as MS 208, MS 272, MS 250, MS 440, CSO 110, or CSO 116. The polysilane may also include a combination of polysilanes and the polycarbosilane may also include a combination of polycarbosilanes. Commercially available polysilanes may include a combination of polysilanes and commercially available polycarbosilanes may include a combination of the polycarbosilanes.

Exemplary modifier sources include inorganic particulates functionalized with a reactive group, organometallic compounds having a reactive group, metal organic compounds having a reactive group, silicon compounds having a reactive group, and boron compounds having a reactive group.

Exemplary reactive groups include amines, tri-functional silanes, halides, hydrides, amides, hydroxides, silyl groups, vinyl groups, allyl groups, alkoxides, alcohols, substituted ethers, and combinations thereof.

Exemplary inorganic particulates include metal powders, ceramic powders, and carbon coated metal powders or carbon coated ceramic powders. The inorganic particulates may have an average diameter of 200 nanometers to 100 micrometers. The inorganic particulates can be functionalized with a reactive group by solution or vapor based coating methods, plasma spray, fluidized bed processing, and the like.

Exemplary organometallic compounds having a reactive group include those compounds having ligands which form volatile leaving groups such as amines, tri-functional silanes, halides, amides, hydroxides, alkoxides, alcohols, substituted ethers, and combinations thereof. Exemplary metals include aluminum, transition metals and refractory metals. Exemplary transition metals include titanium, zirconium, hafnium, vanadium, chromium, or a combination thereof. Exemplary refractory metals include niobium, tantalum, molybdenum, tungsten, rhenium, or a combination thereof. Organometallic compounds may include alkyl and aryl substituted metals, metal amines and metal carbonyls.

Exemplary silicon compounds having a reactive group include allyl trialkoxy silanes, triallyl methyl silane, organosilanes, disilanes, trisilane, and other non-carbon containing silanes. Exemplary boron compounds having a reactive group include organoboranes and trialkyl boranes.

Metal organic compounds may include tantalum pentakis (dimethyl amide), hafnium diethylamide, hafnium tetrakis (ethylmethyl amide), and zirconium tetrakis (dimethylamide).

The preceramic polymer and modifier source are reacted to form the modified preceramic polymer which has a backbone consisting of silicon or a combination of silicon and carbon. The pendant modifier includes metal atoms bonded to the silicon, a pendant carbon or to both. Exemplary structures of the repeating units having a modifier are shown below

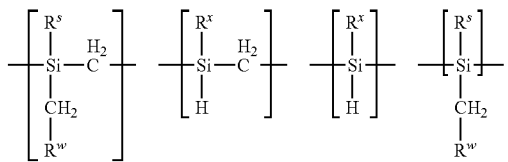

$R^s$, $R^w$, and $R^x$ are individually a pendant modifier as described above. $R^s$, $R^w$ and $R^x$ may all be present, may be present individually, or may be present in some combination. $R^s$, $R^w$ and $R^x$ are functional groups derived from the modifier source. The modified preceramic polymer may include repeating units having functional groups derived from the modifier source as well as repeating units shown in formulas (I) and/or (II).

Reaction conditions may include the use of neat materials, the use of suitable solvents for one or both of the reactants, mild stirring or agitation, ultrasonic or microwave exposure, heating to temperatures as high as 150° C., controlled atmospheres such as inert gas (e.g. argon, helium), reactive atmospheres (e.g. ammonia, hydrogen), reducing atmospheres (e.g. ammonia, hydrogen, carbon monoxide), or sufficient vacuum to remove residual solvent and/or volatile by-products. Additional free radical inducing agents can be introduced to facilitate reaction at the vinyl group.

The modified preceramic polymer may have a pendant modifier to backbone silicon atomic ratio of 4:1 to 0.05:1.

The modified preceramic polymer may have a pendant modifier to carbon atomic ratio of 4:1 to 0.05 to 1.

The modified preceramic polymer may be used to infiltrate a preform made of fibers. Exemplary fibers include carbon fibers, metal fibers, ceramic fibers (e.g. SiC, $Si_3N_4$, SiOC, $Al_2O_3$), glass fibers, E-glass, S2 glass, aramid fibers, e.g., KEVLAR®, polyethylene fibers, e.g., SPECTRA®, coated carbon fibers (e.g., BN coated carbon fibers, BN/SiC coated carbon fibers), carbon fibers with a surface converted to SiC, coated SiC fibers, or combinations thereof. Fibers can be continuous, chopped, woven, braided, discontinuous, uniaxially arranged, or otherwise configured as known in the art.

It is further contemplated that a preceramic polymer may be used to infiltrate a preform prior to modification. The preceramic polymer in the preform may then be reacted with a modifier source to form a modified preceramic polymer. The reaction to form the modified preceramic polymer may be carried out by atomic layer deposition (ALD), molecular layer deposition (MLD), sequential vapor infiltration (SVI), or a combination thereof.

Following infiltration the infiltrated preform including a modified preceramic polymer is subjected to pyrolysis or thermal conversion under controlled atmosphere(s), temperature(s) and time(s) to form a ceramic matrix comprising silicon carbide and additional metal carbide. Exemplary temperatures are 900° C. to 2000° C. Exemplary times are 0.5 hr to 100 hr. Exemplary atmospheres include inert gas (e.g. argon, helium), reactive (e.g. nitrogen) or reducing atmospheres (CO, hydrogen), low pressure or vacuum, or combinations thereof. When boron is present in the modified preceramic polymer, the ceramic matrix may further include metal borides.

In some embodiments the modified preceramic polymer is cured prior to pyrolysis or thermal conversion. Curing includes exposure to external radiation, such as heating, at temperatures up to 250° C. at exposure times ranging from minutes to hours. Alternate external radiation such as microwave and intense pulsed light from xenon flash lamps is also contemplated. The metals in the cured modified preceramic polymer may be supplemented with additional inorganic atoms which may be chemically the same or different from the existing inorganic atoms.

The additional inorganic atoms may be incorporated into the cured modified preceramic polymer by atomic layer deposition (ALD), molecular layer deposition (MLD), sequential vapor infiltration (SVI) or a combination thereof. "Incorporated" includes chemical bonding and/or infiltration into the volume of the cured modified preceramic polymer. Chemical bonding includes all types of chemical bonding, for example, covalent and ionic. The term "sequential vapor infiltration" includes variants such as multiple pulse infiltration and sequential infiltration synthesis. Sequential vapor infiltration diffuses reactants into the polycarbosilane (neat or modified) and incorporates the inorganic species below the surface of the material. Incorporated inorganic species result in bonded inorganic atoms following conversion steps to form the ceramic matrix. SVI, ALD and/or MLD may be combined to result in the desired distribution of inorganic species.

The composite materials and CMCs according to embodiments of the disclosure have a greater than 10% improvement in ceramic yield relative to the ceramic yield of the corresponding unmodified preceramic polymer. Since relatively less mass is lost during thermal processing, the composite materials and CMCs containing the modified preceramic polymer retain their shape and structural functionality without using the extensive fabrication typically required to produce conventional CMCs. The relatively low mass loss corresponds to lower porosity of the composite materials and CMCs, eliminating the need for additional infiltration cycles, which are performed in conventional CMCs and are time consuming.

Additionally the ceramic matrix composites described herein have one or more metal carbides homogeneously distributed throughout the matrix. In some embodiments the metal carbides are distributed on the sub nanometer or molecular level due to the in situ method by which the metal carbides are formed.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A modified preceramic polymer comprising:
a polymer backbone; and
a pendant modifier bonded to the backbone;
wherein the pendant modifier includes silicon, boron, niobium, tantalum, molybdenum, tungsten, rhenium, or a combination thereof; and
the modified preceramic polymer is a reaction product of a preceramic polymer with a modifier source having a reactive group, the reactive group reacted to form the modified preceramic polymer,
the reactive group is an amine, a tri-functional silane, an amide, a hydroxide, a silyl group, a vinyl group, an allyl group, an alkoxide, an alcohol, a substituted ether, or a combination thereof;
wherein the preceramic polymer is a mixture of polysilane and polycarbosilane.

2. The modified preceramic polymer of claim 1, wherein the pendant modifier includes silicon, boron, or a combination thereof.

3. The modified preceramic polymer of claim 1, wherein the pendant modifier to backbone silicon atom ratio is 4:1 to 0.05:1.

4. The modified preceramic polymer of claim 1, wherein the pendant modifier to backbone carbon atom ratio is 4:1 to 0.05:1.

5. The modified preceramic polymer of claim 1, wherein the polymer backbone consists of silicon and carbon.

6. A method of making a modified preceramic polymer comprising:
- reacting a preceramic polymer with a modifier source having a reactive group, the reactive group reacted to form the modified preceramic polymer;
- wherein the preceramic polymer comprises (i) a polymer backbone, and (ii) a pendant modifier bonded to the backbone; and
- the reactive group is an amine, a tri-functional silane, an amide, a hydroxide, a silyl group, a vinyl group, an allyl group, an alkoxide, an alcohol, a substituted ether, or a combination thereof;
- wherein the pendant modifier includes silicon, boron, niobium, tantalum, molybdenum, tungsten, rhenium, or a combination thereof;
- wherein the preceramic polymer is a mixture of polysilane and polycarbosilane.

7. The method of claim 6, wherein the preceramic polymer comprises a vinyl group.

* * * * *